United States Patent [19]
Desilva

[11] Patent Number: 4,842,811
[45] Date of Patent: Jun. 27, 1989

[54] METHOD FOR PREVENTING OXYGEN CORROSION IN A BOILING WATER NUCLEAR REACTOR AND IMPROVED BOILING WATER REACTOR SYSTEM

[75] Inventor: Sunil G. Desilva, Wilkins Township, Allegheny County, Pa.

[73] Assignee: Westinghouse Electric Corp., Pittsburgh, Pa.

[21] Appl. No.: 698,486

[22] Filed: Feb. 5, 1985

[51] Int. Cl.⁴ .............................................. G21C 7/00
[52] U.S. Cl. ..................................... 376/301; 376/306
[58] Field of Search ................. 376/301, 306, 305, 300

[56] References Cited

U.S. PATENT DOCUMENTS

| | | | |
|---|---|---|---|
| 2,863,729 | 12/1958 | McDuffie et al. | 376/301 X |
| 2,945,794 | 7/1960 | Winters et al. | 376/301 |
| 2,961,391 | 11/1960 | King | 376/301 |
| 3,663,725 | 5/1972 | Pearl | 376/306 |
| 4,171,350 | 10/1979 | Sanders | 376/301 |
| 4,226,675 | 10/1980 | Lewis et al. | 376/301 X |
| 4,282,062 | 8/1981 | Stiefel et al. | 376/306 |
| 4,374,083 | 2/1983 | Dewlew et al. | 376/306 |

FOREIGN PATENT DOCUMENTS

| | | |
|---|---|---|
| 145262 | 6/1985 | European Pat. Off. |
| 0105097 | 6/1983 | Japan ................................ 376/306 |
| 300994 | 5/1968 | Sweden. |
| 453032 | 12/1965 | Switzerland. |

OTHER PUBLICATIONS

Rodgers et al., "Catalytic Combiners for Boiling Water Reactors", *Nucl. Eng. Inter.*, Sep., 1973, pp. 711–715.

*Primary Examiner*—John S. Maples

[57] ABSTRACT

An improved boiling water nuclear reactor and method for preventing intergranular stress crack corrosion in the recirculation line of the reactor system where recirculation line coolant water containing dissolved oxygen is diverted from the recirculation loop, hydrogen gas is introduced into the recirculation loop coolant water and the hydrogen-containing recirculation loop coolant water is contacted with a catalyst to enhance reaction of the hydrogen gas with the dissolved oxygen. The deoxygenated recirculation loop coolant water is then returned to the reactor vessel for passage through the core thereof. The hydrogen gas may be added in a stoichiometric amount to remove the dissolved oxygen or in a slight excess so as to suppress radiolysis in the reactor core.

17 Claims, 2 Drawing Sheets

METHOD FOR PREVENTING OXYGEN CORROSION IN A BOILING WATER NUCLEAR REACTOR AND IMPROVED BOILING WATER REACTOR SYSTEM

BACKGROUND OF THE INVENTION

During the past decade, it has been determined that intergranular stress corrosion cracking (IGSCC) of sensitized austenitic stainless steels has been responsible for the occurrence of pipe cracks in boiling water nuclear reactors (BWRs). Research on intergranular stress corrosion has shown that the aggressiveness of 280° C. water to sensitized austenitic stainless steels depends on the content of dissolved oxygen and certain ionic species present in the coolant water passed through the reactor. Data that has been obtained from such studies have shown that intergranular stress crack corrosion can be prevented by reducing the dissolved oxygen content of the cooling water to less than about 20 parts per billion (ppb) and maintaining the conducitivity of the coolant water below about 0.3 s/cm. It is suggested that the dissolved oxygen content of pure water must be reduced to less than 20 parts per billion to prevent intergranular stress crack corrosion of austenitic stainless steel, and even less than 10 parts per billion when reactor coolant water is utilized.

The described findings have led EPRI to perform an in-plant study at Dresden-2 in which hydrogen injection into the feedwater was used to reduce the dissolved oxygen content in the BWR coolant water. The intended outcome was the mitigation of intergranular stress crack corrosion in the reactor coolant recirculation lines of BWRs. Reports on such research have been presented in "Mitigation of Stress Corrosion Cracking in an Operating BWR via $H_2$ Injections" by M. E. Indig and J. E. Weber, in Paper Number 124 presented at the International Corrosion Forum Sponsored by the National Association of Corrosion Engineers, Apr. 18-22, 1983; and in EPRI report "Controlling Stress Corrosion Cracking in BWR Piping by Water Chemistry Modifications", R. L. Jones, A. Machiels, M. Naughton and J. T. A. Roberts, in Paper 167, presented at the NACE Symposium on Corrosion Effects, Events and Control in the Nuclear Power Industry, Apr. 3-5, 1984. The EPRI process involves the injection of a large quantity of hydrogen into the feedwater, to suppress the radiolysis process which occurs into the reactor core and contributes dissolved oxygen to the reactor coolant water. This technique is successfully utilized in pressurized water nuclear reactor coolant water for oxygen control but in the absence of boiling of the reactor coolant water. The Dresden-2 data shows that, for a BWR with the EPRI-GE process, 1.8 parts per million (ppm) dissolved hydrogen must be added to the feedwater to suppress the oxygen content of the reactor coolant water recirculation lines from 200 ppb to less than 20 ppb. The EPRI study at Dresden-2 has shown that reduction of recirculation line oxygen content to less than 20 ppb has been effective in stopping intergranular stress crack corrosion progression. EPRI is recommending this alternate water chemistry that is called "hydrogen water chemistry" to all BWR plants for mitigating intergranular stress crack corrosion. At the presen time, hydrogen water chemistry has been implemented only at Dresden-2. Other BWR plants will probably switch over to a similar process. Although intergranular stress crack corrosion is sufficiently suppressed by the hydrogen water chemistry process, it is far from optimum from an operating viewpoint.

The disadvantages with the present hydrogen water chemistry process for combating intergranular stress crack corrosion can be summarized as follows: (1) inefficient hydrogen usage—large hydrogen usage for this process above stoichiometric requirements; (2) the need to process waste hydrogen gases resulting from the large hydrogen additions; and (3) a four to six-fold increase in the radiation exposure due to increased $N_{16}$ releases, relative to no hydrogen addition. These disadvantages of hydrogen water chemistry stem from the need to add 1.8 ppm of hydrogen to the feedwater in order to suppress the core radiolysis so that a less than 20 ppb dissolved oxygen concentration in the reactor coolant recirculation line is obtained.

In the hydrogen water chemistry process, it is required that 1.8 ppm of hydrogen be added to the main feedwater to reduce the oxygen content of the recirculation lines from 200 ppb to 20 ppb. This process, however, only yields a minor reduction in the main feedwater oxygen content from 30 to 20 ppb. It appears that injection of hydrogen into the main feedwater is thus inefficient in the usage of the added hydrogen. For example, the reaction for the decomposition of water by radiolysis and the reverse reaction for water formation is the same, namely:

$$2H_2 + O_2 \rightleftarrows 2H_2O$$

where the forward reaction leads to the formation of water and the reverse reaction favors the dissolved gases. In a BWR core, the predominant reaction favors the left side of the equation unless an excess of hydrogen or oxygen is present. Computer modeling of radiolysis kinetics can be utilized to determine the minimum core hydrogen concentration which must be maintained to suppress oxygen production. It, however, may not be desirable nor practical to try to achieve this hydrogen concentration in the core. It is known that when hydrogen water chemistry was initiated at Dresden-2, the radiation levels at the plant increased by a factor of 4 to 6 above the pre-addition baseline. This increase in activity was attributed to an increase of $N_{16}$ in the steam. The $N_{16}$ is said to be formed in a reactor core by the nuclear reaction:

$$Oxygen_{16} + neutron \rightarrow Nitrogen_{16} + proton.$$

Under normal water chemistry conditions, the $N_{16}$ reacts with dissolved oxygen to form nitrate $(NO^{-3})$ which is solube in the reactor coolant water. Under hydrogen water chemistry conditions, there is an insufficient amount of oxygen present to convert the $N_{16}$ to nitrate. The $N_{16}$ therefore ends up as a more volatile species such as ammonia and is removed from the water by steam. The decay of the $N_{16}$ gives off high energy gamma thereby increasing the radiation exposure levels at a plant.

This explains one of the drawbacks of the hydrogen water chemistry process. In addition, the other drawbacks are related. The added 1.8 ppm hydrogen in the feedwater has a great difficulty in remaining in the reactor core due to boiling which occurs there. The stripping process from the boiling thus requires excessive hydrogen addition to maintain the minimum radiolysis suppression concentration of hydrogen in the reactor core. This also puts a tremendous burden on the off-gas recombiners, which now must handle the added discharge hydrogen, without the initially available discharge oxygen. This has necessitated injection of oxygen into the recombiner and the total operating cost for hydrogen water chemistry due to these problems has been estimated to exceed 500,000 dollars per year. Because of the complexity of the process in which oxygen is removed in the reactor core by adding hydrogen to the feedwater, and thus to the core, and then the off-gas hydrogen is removed by injecting oxygen into the recombiners, availability for the hydrogen water chemistry system has at times been less than 60 percent. Off-gas fires have also been frequent at Dresden-2 during the initial to 6 month test.

The intergranular stress crack corrosion has only been observed in the reactor coolant recirculation lines in which about 200 ppb or more of dissolved oxygen was detected. No such cracking was observed in the remainder of the feedwater piping where about 30 ppb dissolved oxygen was typically detected. Such an observation suggests that the optimum solution for the BWR intergranular stress crack corrosion problem would involve deoxygenation of the recirculation line without significantly altering the normal operating dynamics of the BWR water chemistry.

An object of the present invention is to effect the major oxygen removal of the reactor coolant water recirculation lines outside the core, to avoid the above identified disadvantages associated with conventional hydrogen water chemistry.

SUMMARY OF THE INVENTION

The present invention provides an improved boiling water nuclear reactor and a method for the prevention of intergranular stress crack corrosion in the recirculation lines of the reactor. Recirculation coolant water containing dissolved oxgyen is directed from the recirculation loop and hydrogen gas injected into the diverted recirculation coolant water, and hydrogen gas-containing coolant water is contacted with a catalyst that enhances reaction between the added hydrogen and the dissolved oxygen, to remove dissolved oxygen from the reactor coolant. After the dissolved oxygen has been removed from the diverted reactor coolant, the reactor coolant is returned to the reactor vessel for passage through the core of the reactor.

The amount of hydrogen added to the diverted coolant water may be that sufficient to remove the dissolved oxygen therefrom or an excess sufficient to suppress radiolysis in the reactor core. The oxygen and hydrogen contents of the diverted water before addition of the hydrogen and after contact with the catalyst are monitored. The oxygen and hydrogen content of the main feedwater flow to the reactor may also be monitored.

DETAILED DESCRIPTION

Figure 1:
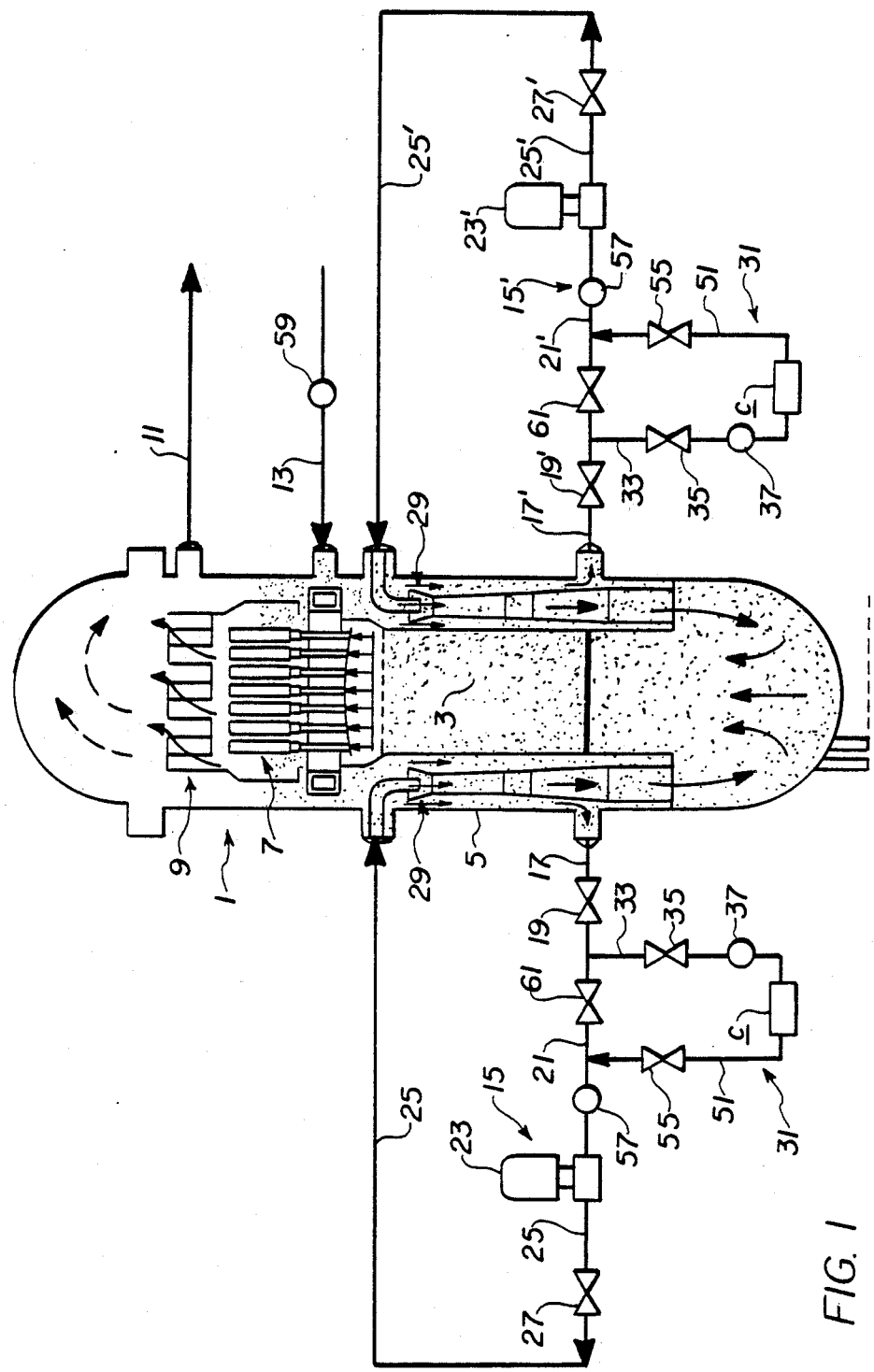
FIG. 1 is a schematic illustration of a boiling water reactor vessel and coolant water recirculation loops showing an embodiment of the present invention.

Intergranular stress crack corrosion in a boiling water reactor is prevented by reducing the oxygen content of the reactor coolant water according to the present invention, where the reactor coolant water in the recirculation loops of the reactor has hydrogen gas injected therein and the hydrogen gas-containing coolant water is contacted with a catalyst to enhance the reaction of the hydrogen gas with dissolved oxygen in the coolant water, and the deoxygenated coolant water is returned to the boiling water reactor vessel for passage through the core of the reactor. The present process deoxygenates the coolant water in the reactor coolant water recirculation loops and partially suppresses the radiolysis oxygen generation that occurs in the boiling water reactor core. The present process is usable as a retrofit in existing boiling water reactors or as an improved boiling water reactor system design.

Recirculation coolant water is diverted from the conventional recirculation loop, after the coolant water has been passed through the reactor core and discharged from the reactor vessel. Hydrogen gas is injected into the diverted coolant water, such as by a sparger, and the hydrogen gas-containing coolant water contacted with a catalyst, in a catalytic reactor, that enhances the reaction of the hydrogen gas with dissolved oxygen contained in the coolant water. By analyzing the oxygen content of the coolant water prior to introduction of the hydrogen gas, the stoichiometric amount of hydrogen needed to react with the dissolved oxygen in the coolant water can be determined, and the stoichiometric amount required plus a sufficient amount of excess hydrogen to partially suppress core radiolysis is added to the coolant water. The excess hydrogen requirement will be determined via computer modeling of radiolysis production rates for oxygen under the operating conditions of the boiling water reactor. The excess hydrogen concentration that is added is designed to reduce core exit oxygen without increasing the $N_{16}$ releases or hydrogen recombiner requirements.

After the addition of the hydrogen gas to the coolant water, the same is charged to a catalytic reactor containing the desired catalyst for enhancing the reaction of the added hydrogen with the dissolved oxgyen in the coolant water. The catalyst present in the catalytic reactor is a solid catalyst that is stable at the temperatures and pressures normally present in reactor coolant water recirculation loop. Examples of suitable catalysts are activated charcoal, and noble metals such as platinum and palladium, dispersed on a solid carrier. The solid carrier medium should be water-insoluble, physically stable under the conditions present in the catalytic reactor, and provide a support for the plantinum or palladium metal catalyst. Useful as such a solid carrier is a polystyrene-based ion exchange resin, such as the platinum-containing, polystyrene-based anion exchange resin sold by Mobay Chemical Corporation under the trademark Lewatit OC 1045. Such catalyst systems are described in my co-pending application, Ser. No. 550,660, filed Nov. 10, 1983 now abandoned assigned to the assignee of the present invention, said co-pending application incorporated by reference herein. Contact times of the hydrogen gas-containing coolant water with the catalyst would be determined to give a desired residual oxygen content in the coolant water discharged from the catalytic reactor for return to the boiling water reactor vessel. By use of an oxygen and hydrogen gas analyzer in the effluent from the catalytic reactor, the content of those gases in the coolant water returned to the pressure vessel are readily determined. Preferably, the dissolved oxygen content of the diverted water returned to the recirculation line would be about 2 ppb or less, with residual hydrogen content available for oxygen suppression in the core.

By use of the present process, the major oxygen removal from the coolant water is effected outside the BWR core. Where core radiolysis oxygen suppression requires an excess of hydrogen, as in the hydrogen water chemistry system, in the coolant water, recombination on the catalyst surface requires only stoichiometric hydrogen addition. Thus, only about 25 ppb of hydrogen would be required to totally remove the 200 ppb of dissolved oxygen from the recirculation loop. In the hydrogen water chemistry system, however, 1.8 ppm hydrogen is added to the main feedwater. The main feedwater mass flow rate is twice that of the recirculation line mass flow rate. This indicates that the hydrogen that is presently added to the feedwater is twice the amount that would be needed to achieve a concentration of 1.8 ppm hydrogen in the recirculation loop. In the present process, some excess hydrogen would be added in to partially suppress radiolysis, but not totally stop the core oxygen production, so that $N_{16}$ release will not be elevated.

The present process provides for a dissolved oxygen concentration of about 2 ppb in the recirculation piping, and reduced hydrogen consumption relative to the hydrogen water chemistry approach. It also results in reduced radiation exposure, lower incidences of off-gas fires, and reduced processing requirements for the recombiners relative to the hydrogen water chemistry approach. The process will further result in a simpler operating system and lower operating cost.

A calculation of the total feedwater oxygen input concentration in a BWR under conditions of normal water chemistry (A), hydrogen water chemistry (B), and the present catalytic oxygen suppression system (C) based on the calculations wherein:

Total Feedwater = ⅓ reactor coolant for recirculation + ⅔ main feed components for a BWR coolant; such that, Total Feedwater Oxygen Concentration = 
$$\frac{(1)\ O_2\ \text{reactor coolant from recirculation} + (2)\ O_2\ \text{main feedwater}}{3}$$

are listed in the following Table:

| Method | $(O_2)$ Reactor Coolant Recirculation (ppb) | $(O_2)$ Main Feedwater (ppb) | Total Feedwater Oxygen Input Concentration (ppb) |
|---|---|---|---|
| A | 170 | 30 | 77 |
| B | 14 | 20 | 18 |
| C | 1 | 15* | 11 |

*projected via partial radiolysis suppression

A schematic illustration of a boiling water reactor adapted for use of the present process is given in FIG. 1. A boiling water reactor 1, contains a nuclear core 3 within a pressure vessel 5. Coolant water is circulated upwardly through the core as indicated by the arrows, with the heat of the core producing saturated steam which is separated from recirculation water in the stream separators 7. The steam is dried in steam driers 9 at the top of the vessel and directed through the main steam line 11 to a steam turbine generator (not shown). The steam, after use in the steam turbine generator is condensed and returned through the main feedwater line 13 to the pressure vessel 5 for recirculation downwardly about the reactor core 3 and then upwardly therethrough. A plurality, usually two, recirculation loops 15, 15' are also provided to cool the reactor. Each recirculation loop 15, 15' comprises a line 17, 17' leading to first valve 19, 19', a line 21, 21' leading from the first valve to a recirculation pump 23, 23', and return lines 25, 25' from the pump 23, 23', containing a second valve 27, 27', back to the pressure vessel 5. Jet pumps 29 are provided in the pressure vessel 5 which mix the main feedwater with recirculated coolant from the external recirculation pumps 23, 23'. The flow of coolant through the core 3 is the sum of the flow from the main feedwater line 13 and the recirculation flow from recirculation loops 15 and 15'. The two reactor coolant recirculation loops together recirculate about one-third of the reactor coolant water while the remaining about two-thirds is from the main feedwater line and injected at a main feed point at the top of the core annulus. The above description is that of a conventional boiling water reactor to which the present process is applicable.

Figure 2:
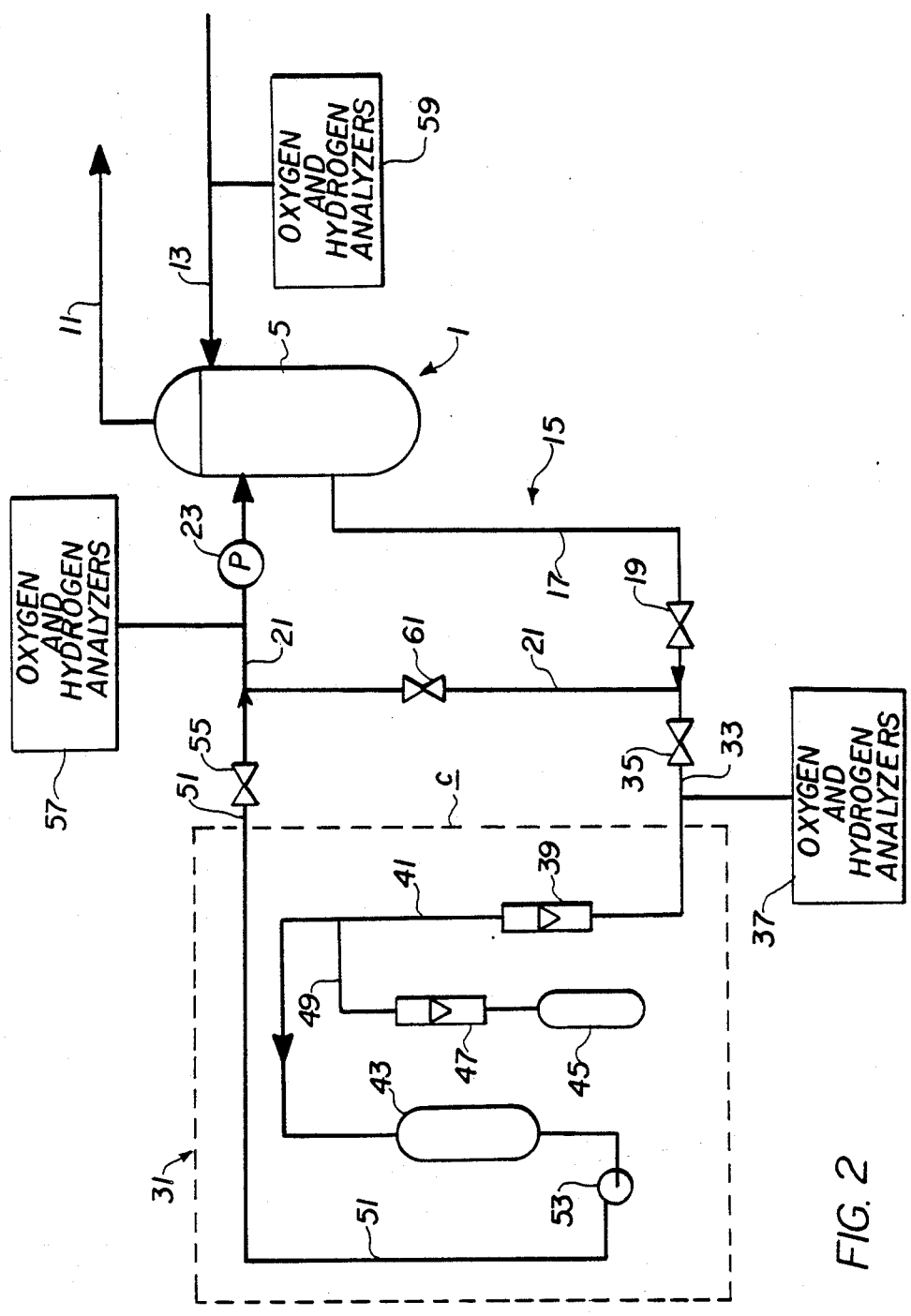
FIG. 2 is a schematic representation of the flow path of one recirculation loop of the catalytic oxygen suppression system of the present invention.

In accordance with the present process, a catalytic oxygen suppression system 31 is incorporated into each of the recirculation loops 15, 15'. A schematic representation of one of the catalytic oxygen suppression systems, 31, is made in FIG. 2. The catalystic oxygen suppression system contains a by-pass line 33 containing a flow control valve 35. The flow through the line 33 is analyzed for oxygen and hydrogen content in an analyzer 37 and passed to a catalytic reactor system c. The catalytic reactor system c has a through which the coolant flows, and the coolant passes by means of line 41 to a catalytic reactor 43. Hydrogen gas from a source 45 is metered through a flow meter 47 in line 49 and injected into the coolant in line 41 prior to charging of the coolant into the catalytic reactor 43. After contact of the hydrogen-containing coolant with the catalyst in the catalytic reactor 43 to remove dissolved oxygen from the coolant, the deoxygenated coolant passes through line 51, containing a pump 53, from the catalytic reactor system c, back to the line 21, and then through pump 23 to the reactor. A flow control valve 55 is provided in line 51. An analyzer 57 is provided in line 21, downstream of the catalytic oxygen suppression system 31, to monitor the hydrogen and oxygen content of the recirculated coolant. A further analyzer 59 may be provided in main feedwater line 13 to monitor the oxygen and hydrogen contents of the main feedwater. Valve 61 is provided in line 21 between the off-take line 33 and return line 51.

What is claimed is:

1. In a method for prevention of corrosion, due to oxygen activity, in a boiling water nuclear reactor system having a main feedwater recirculation loop comprising a reactor vessel with a reactor core, and with a steam off-take line and a condensate return line in flow communication with the vessel for recirculating feedwater between the reactor and a steam turbine, and coolant water recirculation loops comprising coolant water off-take and return lines in flow communication with the vessel for recirculating coolant water in the vessel, wherein hydrogen is added to the coolant water passing through the reactor core to reduce the oxygen content of the coolant water, the improvement wherein:

recirculation coolant water containing dissolved oxygen, after passage through the reactor core, is diverted from the recirculation loop;

hydrogen gas is added to said diverted coolant water;

the hydrogen-containing diverted coolant water is contacted with a catalyst effective to enhance reaction of hydrogen with oxygen contained in the coolant water; and the diverted coolant water, after reaction of the hydrogen gas with the oxygen contained therein, is returned to the recirculation loop for passage through the reactor core.

2. The method as defined in claim 1, wherein said catalyst is contained in a catalytic reactor and the oxygen and hydrogen content of the diverted coolant water is determined prior to addition of said hydrogen gas.

3. The method as defined in claim 2, wherein the oxygen and hydrogen content of the diverted coolant water is determined, after contact with the catalyst and prior to return for passage thorugh the reactor core.

4. The method as defined in claim 3 wherein an amount of hydrogen gas is added that is substantially a stoichiometric amount to combine with the dissolved oxygen present in the diverted coolant water.

5. The method as defined in claim 3 wherein an amount of hydrogen gas is added that is a stoichiometric amount to combine with the dissolved oxygen and, in addition, partially suppress radiolysis in the reactor core upon passage through the reactor core.

6. The method as defined in claim 3 wherein the oxygen and hydrogen content of the reactor coolant in the main feedwater recirculation loop is determined prior to entry to the reactor.

7. The method as defined in claim 1 wherein said catalyst is activated charcoal.

8. The method as defined in claim 1 wherein said catalyst is a noble metal, selected from the group consisting of palladium and platinum, dispersed on a stable carrier material.

9. The method as defined in claim 8 wherein said stable carrier material is a polystyrene-based anion exchange resin.

10. In a boiling water nuclear reactor having a core in a pressure vessel and means for passage of coolant water through the core, with a steam off-take line and a main feedwater line for returning a major portion of reactor coolant water to the pressure vessel, and a plurality of coolant water recirculation lines in flow communication with the pressure vessel for return of a minor portion of reactor coolant water to the pressure vessel, the improvement wherein each of said coolant water recirculation lines has:

means for introducing hydrogen gas into the recirculation line;

means for catalytically reacting said introduced hydrogen gas with dissolved oxygen in said recirculation line coolant water to reduce the oxygen content of the recirculation line coolant water; and means for returning the recirculation line coolant water, with reduced oxygen content, back to the reactor vessel.

11. In a boiling water nuclear reactor as defined in claim 10, the improvement wherein said means for introducing hydrogen gas into the recirculation line is a by-pass line and means for introducing hydrogen gas into said by-pass line.

12. In a boiling water nuclear reactor as defined in claim 11, the improvement wherein said by-pass line has means thereon for analyzing the oxygen and hydrogen content of the coolant water therein prior to introduction of said hydrogen gas.

13. In a boiling water nuclear reactor as defined in claim 12, the improvement wherein means for analyzing the oxygen and hydrogen content of said coolant water is provided, after said means for catalytically reacting said introduced hydrogen gas and prior to return of the recirculation line coolant water back to the reactor.

14. In a boiling water nuclear reactor as defined in claim 13, the improvement wherein means for analyzing the oxygen and hydrogen content of the coolant water is provided in the main feedwater line.

15. In a boiling water nuclear reactor as defined in claim 10, the improvement wherein said means for catalytically reacting said introduced hydrogen gas with dissolved oxygen in said recirculation line coolant water is a reactor vessel containing activated charcoal.

16. In a boiling water nuclear reactor as defined in claim 10, the improvement wherein said means for catalytically reacting said introduced hydrogen gas with dissolved oxgyen in said recirculation line coolant water is a reactor vessel containing a noble metal selected from the group consisting of palladium or platinum dispersed on a stable carrier material.

17. In a boiling water nuclear reactor as defined in claim 16, the improvement wherein said stable carrier material is a polystyrene-based anion exchange resin.

* * * * *